US008698605B2

(12) United States Patent
Kim (10) Patent No.: US 8,698,605 B2
(45) Date of Patent: Apr. 15, 2014

(54) DETERMINING THE VALIDITY OF A CONNECTION BETWEEN A READER AND A TRANSPONDER

(75) Inventor: Chong Hee Kim, Louvain-la-Neuve (BE)

(73) Assignee: NXP B.V., Eindhoven (NL)

( * ) Notice: Subject to any disclaimer, the term of this patent is extended or adjusted under 35 U.S.C. 154(b) by 895 days.

(21) Appl. No.: 12/772,071

(22) Filed: Apr. 30, 2010

(65) Prior Publication Data

US 2010/0295664 A1 Nov. 25, 2010

(30) Foreign Application Priority Data

Apr. 30, 2009 (EP) ..................................... 09159170

(51) Int. Cl.
*H04Q 5/22* (2006.01)
*H04L 9/32* (2006.01)
*H04L 9/08* (2006.01)

(52) U.S. Cl.
USPC ........ 340/10.41; 340/10.1; 713/168; 380/277

(58) Field of Classification Search
USPC ........ 340/526, 529, 4.35, 5.1, 5.2, 5.21, 10.1, 340/10.4, 10.41; 713/181
See application file for complete search history.

(56) References Cited

U.S. PATENT DOCUMENTS

| 2002/0034299 | A1* | 3/2002 | Charrin .......................... 380/251 |
| 2003/0043023 | A1* | 3/2003 | Perraud et al. ............... 340/10.1 |
| 2004/0041695 | A1* | 3/2004 | Reining ........................ 340/10.2 |
| 2006/0248340 | A1  | 11/2006 | Lee et al. |
| 2007/0109124 | A1* | 5/2007 | Park et al. .................. 340/572.1 |
| 2009/0267747 | A1* | 10/2009 | Rivest et al. ............... 340/10.51 |

OTHER PUBLICATIONS

Nikov V. et al.: "Yet Another Secure Distance Bounding Protocol," Cryptology Eprint Archive, Online, 2008.
Munilla J. et al.: "Enhanced Low-Cost RFID Protocol to Detect Relay Attacks," Wireless Communications and Mobile Computing, Online, Mar. 2009.
Gerhard P. et al.: "An RFID Distance Bounding Protocol," Proceedings of the First International Conference on Security and Privacy for Emerging Areas in Communications Networks, Sep. 2005, pp. 67-73.
Brands, S. et al. "Distance-Bounding Protocols", Advances in Cryptology—Eurocrypt 93, vol. 765 of Lecture Notes , 16 pgs (1994).
Hancke, G. P. et al. "An RFID Distance Bounding Protocol", IEEE First International Conference on Security and Privacy for Emerging Areas in Communciations Networks, p. 67-73 (2005).
Desmedt, Y. "Major Security Problems with the "Unforgeable" (Feige-)Fiat-Shamir Proofs of Identity and How to Overcome Them", Securicom 88—6th Worldwide Congress on Computer and Communications Security and Protection, 14 pgs (1988).

(Continued)

*Primary Examiner* — Steven Lim
*Assistant Examiner* — Omeed Alizada (57) ABSTRACT

Reader (201) for determining the validity of a connection to a transponder (202) wherein the reader (201) is designed to measure a response time of a transponder (202) based on a time interval between sending a first binary code based on predefined numbers to said transponder (202) and receiving a second binary code from said transponder (202) in response to the first binary code and wherein the reader (201) is designed to authenticate the transponder (202) based on the received second binary code simultaneously with the measuring of the response time.

11 Claims, 5 Drawing Sheets

Normal operation-
In close proximity

Relay attack (56) References Cited

OTHER PUBLICATIONS

Munilla, J. et al. "Distance Bounding Protocols for RFID Enhanced by Using Void-Challenges and Analysis in Noisy Channels", Wireless Communications and Mobile Computing, 6 pgs (2008).

Munilla, J. "Distance Bounding Protocols with Void-Challenges for RFID", Dpto. Ingenieria de Comunicaciones. E.T.S.I. Telecommunication. Universidad de Malaga (Spain), 37 pgs (2006).

Singelee, D. et al. "Distance Bounding in Noisy Environments", Lecture Notes of Computer Science, In Security and Privacy in Ad-hoc and Sensor Networks—ESAS, vol. 4572, p. 101-115 (2007).

Yu-Ju, T. et al "RFID Distance Bounding Protocols", $1^{st}$ International EURASIP Workshop in RFID Technology, 2 pgs (2007).

* cited by examiner

DETERMINING THE VALIDITY OF A CONNECTION BETWEEN A READER AND A TRANSPONDER

FIELD OF THE INVENTION

The invention relates to a reader for determining the validity of a connection to a transponder, designed to measure a response time of a transponder and to authenticate the transponder. Furthermore the invention relates to a transponder for determining the validity of a connection to a reader, designed to provide information for response time measurement to said reader and to provide information for authentication to said reader. Moreover, the invention relates to a method for a reader of determining the validity of a connection to a transponder and to a method for a transponder of determining the validity of a connection to a reader. Beyond this, the invention relates to a program element. Furthermore, the invention relates to a computer-readable medium.

BACKGROUND OF THE INVENTION

The so-called "relay attack problem" occurs when transponders (in particular smart cards and RFID tags) are used. Transponders are usually read by a reader which is very close to the transponder (near field communication). With the relay attack this local binding is released for criminal acts.

In an example, person A is in a bar and has parked his car in front of the bar. The car is equipped with a key less entry feature (that is to say car access by means of a transponder, in particular a smart card). Person B reads the data from the transponder, which A has in his pocket, and sends the data via a mobile phone to person C who stands next to the car. In this way C can open the car without giving A a chance to be aware of the theft.

When a transponder is read by a reader the measurement of the response time can be measured to detect such a relay attack, as the transmission via e.g. GSM takes longer than the near field communication. If the response time is out of a predetermined time window, access can be denied. Because of faster and faster transmission means, one will try to make this time window as small as possible.

However, there is the time needed for encryption/decryption during authentication. Because the algorithms for authentication become more complex, there is a physical limit for the time window.

Hancke, G. P., Kuhn, M. G., "An RFID Distance Bounding Protocol", First International Conference on Security and Privacy for Emerging Areas in Communications Networks 2005, SecureComm 2005, pp. 67-73, discloses that radio-frequency identification tokens, such as contactless smartcards, are vulnerable to relay attacks if they are used for proximity authentication. Attackers can circumvent the limited range of the radio channel using transponders that forward exchanged signals over larger distances. Cryptographic distance-bounding protocols that measure accurately the round-trip delay of the radio signal provide a possible countermeasure. They infer an upper bound for the distance between the reader and the token from the fact that no information can propagate faster than at the speed of light. A distance-bounding protocol based on ultra-wideband pulse communication is disclosed. Aimed at being implementable using only simple, asynchronous, low-power hardware in the token, it is particularly well suited for use in passive low-cost tokens, noisy environments and high-speed applications.

OBJECT AND SUMMARY OF THE INVENTION

Hence, it is an object of the invention to provide a reader and/or a transponder being operable in a safe manner.

The object of the invention is achieved by a transponder, a reader, methods, a program element and a computer-readable medium according to the independent claims.

According to an exemplary embodiment, a reader (which may be communicatively coupled with a transponder) for determining the validity of a connection to a transponder (particularly an authorized transponder which may be communicatively coupled with the reader) is provided, wherein the reader is designed to measure a response time of a transponder based on a time interval between sending a first binary code based on predefined numbers to said transponder and receiving a second binary code from said transponder in response to the first binary code and wherein the reader is designed to authenticate the transponder based on the received second binary code simultaneously with the measuring of the response time.

According to another exemplary embodiment, a transponder for determining the validity of a connection to a reader is provided, wherein the transponder is designed to provide information for response time measurement to the reader, to authenticate the reader based on a first binary code received from the reader during the response time measurement, wherein the first binary code is based on predefined numbers, and to provide information for authentication to the reader by sending a second binary code in response to the first binary code.

According to still another embodiment, a communication system for determining the validity of a connection between a reader and a transponder is provided, wherein the communication system comprises a reader and a transponder with the above mentioned features.

According to still another exemplary embodiment, a method for a reader (or performed by a reader) of determining the validity of a connection (of the reader) to a transponder is provided, the method comprising:

sending a first binary code to said transponder,
receiving a second binary code from said transponder in response to the first binary code,
measuring a response time of the transponder based on a time interval between sending the first binary code and receiving the second binary code,
authenticating the transponder based on the received second binary code simultaneously with the measuring of the response time.

According to yet another exemplary embodiment, a method for a transponder of determining the validity of a connection to a reader is provided, the method comprising:

providing information for response time measurement to the reader,
authenticating the reader based on a first binary code received from the reader during the response time measurement,
providing information for authentication to the reader by sending a second binary code in response to the first binary code.

According to still another exemplary embodiment of the invention, a program element (for instance a software routine, in source code or in executable code, for instance a downloadable program) is provided, which, when being executed by a processor, is adapted to control or carry out one of the methods having the above mentioned features.

According to yet another exemplary embodiment of the invention, a computer-readable medium (for instance a CD, a DVD, a USB stick, a floppy disk or a harddisk) is provided, in which a computer program is stored which, when being executed by a processor, is adapted to control or carry out one of the methods having the above mentioned features.

Data processing which may be performed according to embodiments of the invention can be realized by a computer program, that is by software, or by using one or more special electronic optimization circuits, that is in hardware, or in hybrid form, that is by means of software components and hardware components.

The term "transponder" may particularly denote an RFID tag or a (for instance contactless) smartcard. More generally, a transponder may be a device (for instance comprising a chip) which may automatically transmit certain (for example coded) data when activated by a special signal from an interrogator.

The term "reader" may particularly denote a base station adapted for sending an electromagnetic radiation beam for reading out a transponder and detecting a back reflected or emitted signal. The reader device may be adapted as one of the group consisting of a read and/or write device, an RFID reader, a contactless chip card reader, a passive transponder, and a Near Field Communication device. However, communication can also take place over a wired interface.

One or more "applications" may be provided by a communication system formed by the transponder and the reader. Such an application may particularly denote a service within the communication system formed by the reader and the transponder to which service the transponder and/or the reader may provide a contribution. The provision of such a contribution may involve the capability of the transponder to provide stored or calculated data, to provide processing capabilities, etc. Examples for such services is the payment of a fare for using a public transportation by a user of the transponder, the payment of a purchase price for a good by a wireless payment system, etc.

The term "binary code" may denote a code comprising one or more binary bits. Thus, the code may be simple provided without any further definitions. The first and the second binary code may be based on predefined numbers. The codes may be for example generated by a hash function or may be a Message Authentication Code. The term "Message Authentication Code" (MAC) may particularly denote a short piece of information used to authenticate a message. A MAC algorithm may accept as input a secret key and an arbitrary-length message to be authenticated, and may output a MAC. The MAC value may protect both a message's data integrity as well as its authenticity, by allowing verifiers (who also possess the secret key) to detect any changes to the message content.

The predefined numbers may be exchanged between the reader and the transponder in advance or already known (for example stored in a memory) to both entities.

The authentication of the transponder may be performed simultaneously with the measuring of the response time. Thus, it may not be necessary to perform different transfers or communications for the authentication and the measuring of the response time but may be performed during the same time period. This may allow for a very efficient usage of bandwidth. Further, it may be performed with the same communication messages. Thus, the determination of the validity of a connection to a transponder may be efficient and timesaving.

An embodiment of the invention offers the advantage that the transponder may perform an authentication of the reader by receiving the first binary code and therefore a qualification whether a connection between a reader and a transponder is valid (that is a determination whether the connection is corrupted or not). The transponder may compare the first binary code to a code which is stored in or generated by the transponder. Thus, a double authentication may be provided increasing the security of such a system. In other words that means that an attack, in particular a relay attack, may be detectable with high probability.

Embodiments of the invention may have the following further advantages:

For instance, such a system is applicable to mass transit, but also to keyless entry systems in cars and many other applications.

A corresponding communication system is for instance applicable to DRM protected content which is only to be consumed at a certain location.

A corresponding communication system is for instance applicable to prisoners on parole who need to stay at home.

Hence, embodiments of the invention provide a proper solution for determining the validity of a connection between a reader and a transponder.

In the following, further exemplary embodiments of the reader will be explained. However, these embodiments also apply to the transponder, to the communication system, to the methods, to the program element and to the computer-readable medium.

According to an exemplary embodiment, the reader may be designed to send a first random number to the transponder and to receive a second random number from the transponder for generating the first binary code based on the first random number and the second random number, wherein the first random number and the second random number correspond to the predefined numbers, and wherein the first binary code is a random number or a predefined number depending on the first and the second random number. The random numbers may be exchanged in this embodiment before starting the validity determination. The reader and the transponder may subsequently determine different sets of numbers based on the exchanged random numbers. These numbers may be binary values as for example bits determined by a hash function. The sets may be for example the first binary code and the second binary code.

According to a further exemplary embodiment, the reader is designed to authenticate the transponder based on an evaluation whether the second binary code is valid, the second binary code being generated based on the first binary code, the first random number and the second random number. The transponder may for example choose the second binary code based on the received first binary code. Thus, it may be possible for the reader to determine, if the second binary code sent by the transponder corresponds to an estimated code in response to the first binary code.

According to a further exemplary embodiment, the reader is designed to qualify the connection to the transponder as valid only upon determining that both the time interval is within a predetermined time window (for instance is smaller than a predefined threshold time) AND that the received second binary code is valid. The response time may be indicative for a time required by the transponder to send an answer to a query of the reader. When the reader measures such a time interval, it is possible to evaluate the time required for the transponder for sending the first random number. In case of a relay attack problem (which involves an additional transmission path due to the attack), this time will be longer than a predetermined threshold value. For example, if the measured response time is smaller than a predetermined threshold value, the connection between transponder and reader may be classified as valid. Simultaneously, the reader may authenticate the transponder based on an evaluation whether a second binary code received from the transponder is valid. This may allow to safely identify the transponder and simultaneously to be sure that only an authorized transponder communicates with the reader, thereby eliminating the relay attack problem with high degree of safety.

In other word, the above exemplary embodiment may comprise a logic AND combination between the two criteria which may be necessary to accept the connection between transponder and reader as valid. A first criterion is that the time interval of the transponder for responding to the first command is shorter than a predetermined threshold value. This can ensure that a relay attack problem can be ruled out. Since the transmission of the first response is performed without any processing load or task performed by the transponder, the actual transmission time is a proper measure for the length of the transmission path between transponder and reader and is significantly changed in case of a relay attack problem. The second criteria may ensure that the same transponder which has previously sent a second random number also provides a second binary code which may be formed by a combination of the second random number (stored in the transponder), the first random number (transmitted by the reader) and the first binary code (also transmitted by the reader).

Next, further exemplary embodiments of the transponder will be explained. However, these embodiments also apply to the reader, to the methods, to the program element and to the computer-readable medium.

The transponder may be designed to receive a first random number from the reader and to send a second random number to the reader for generating the first binary code based on the first random number and the second random number. This second random number may be sent from the transponder to the reader in an unencrypted (or plaintext) form.

Particularly, the transponder may be designed to authenticate the reader based on an evaluation whether the first binary code generated based on the first random number and the second random number is valid. Therefore, a double authentication may be possible as already the transponder may perform an authentication. If the authentication fails, the transponder may react to this failure.

The transponder may be designed to generate the second binary code comprising a first value based on the first random number, the second random number and the first binary code when the first binary code is valid. Thus, the second binary code may be easily determined and it may be obvious to the reader, if the transponder has received a correct first binary code without a relay attack.

The transponder may be designed to generate the second binary code comprising a second value based on the first random number, the second random number and the first binary code when the first binary code is invalid. Thus, the reader may be easily detect if the transponder has received a valid or invalid first binary code as the reader may compare the received second binary code with the estimated second binary code. Simultaneously, a potential attacker may not be capable to realize, if the attack has already been detected. The transponder may further be designed to receive further first binary codes, and, after the first binary code was invalid, to send further second binary codes in response to the further received first binary codes, wherein the further second binary codes comprise a third value complementary to the second value, or after the first binary code was invalid, to send further second binary codes in response to the received further received first binary codes, wherein the further second binary codes comprise randomly the second value or the third value complementary to the second value. Thus, a potential attacker may not be capable to recognize that the attack has already been detected. Simultaneously, the reader may recognize that the transponder has detected a failure and further may be able to measure a response time to determine a possible attack.

Each of the random numbers may be a pseudo random number or a truly random number. In contrast to a pseudo random number, a truly random number is a number produced independently of its generating criteria. For cryptographic purposes, numbers based on physical measurements may be considered as random. Pseudo random numbers may be numbers with as little detectable pattern as possible but not truly random. Computer programs may make pseudo random numbers because they cannot make truly random numbers. The random number generator may be part of the transponder/reader.

Any one of the random numbers and the key may be any sequence of numeric characters, sequence of letters, or any alphanumeric code.

Embodiments of the invention are related to transponders, in particular smart cards and RFID tags. For the sake of clarity, this description makes reference primarily to smart cards, although for one skilled in the art it is clear that embodiments of the invention equally relate to RFID tags and transponders in general, as well as to devices in general which communicate over a wired or wireless connection.

These and other aspects of the invention are apparent from and will be elucidated with reference to the embodiments described hereinafter.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

The illustration in the drawing is schematically. In different drawings, similar or identical elements are provided with the same reference signs.

Exemplary embodiments of the invention allow to prevent relay attacks of transponder reader systems.

In the following, referring to FIG. 1, it will be explained what a relay attack is.

For this purpose, a transaction is considered using a secure element that is at a distance rather than in close proximity as is intended for these transactions.

Figure 1:
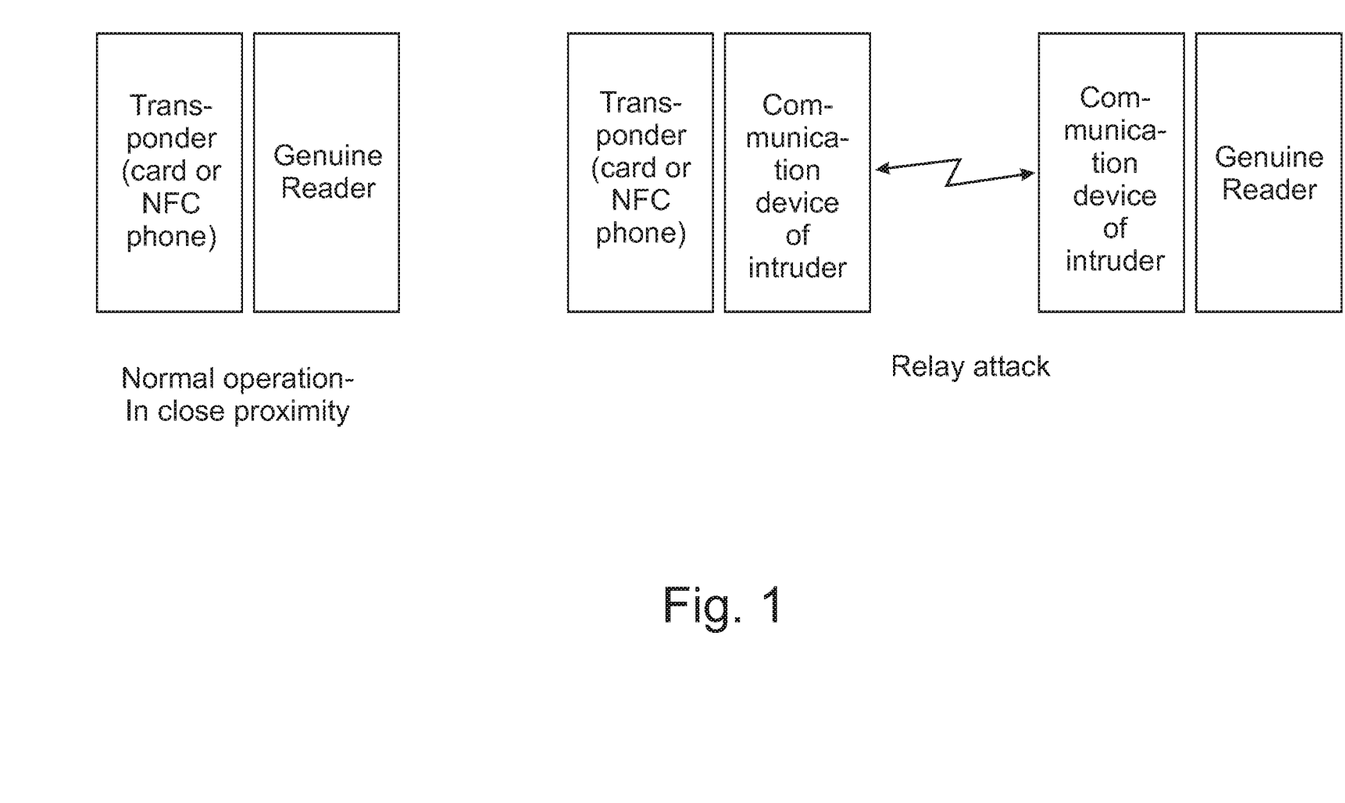
FIG. 1 shows the principles of a relay attack.

FIG. 1 shows a first scenario 100 indicating a normal operation in which a transponder 120 and a genuine reader 140 are in close proximity. The transponder 120 may for example be a smart card or an NFC (Near Field Communication) phone.

FIG. 1 shows a second scenario 150 indicating the presence of a relay attack. In addition to the transponder 120 and the reader 140, a first communication device of an intruder 160 and a second communication device of an intruder 170 are introduced in a communication path of the transponder 120 and the reader 140. Although the presence of the additional communication devices 160, 170 has the consequence that the communication time between transponder 120 and reader 140 is increased, it may conventionally happen that the communication devices 160, 170 may operate the transponder or reader 120, 140 in an undesired manner.

The relay attack may work even when these devices 160, 170 do not know any key. The relay attack works especially well if a transaction can be made without a user action being required (like access to a mass transit). For example, in a full bus or metro it may happen that an attacker may easily find somebody having a transponder that will respond to an intrusion device 160, 170 acting as a reader 140. It is possible to communicate via a mobile phone 160 or 170 to someone else holding his phone at an entry station of the metro. Such a person may get access, and the person in the bus pays. Such relay attacks are applicable for instance to mass transit, but also to key less entry systems in cars.

However, the above system description is only one example where embodiments of the inventions can be used to prevent successful relay attacks. As alternatives to a scenario of an intruder trying to do a relay attack, it is also possible to apply exemplary embodiments of the invention to a legitimate user who, in another system, tries to use a service remotely while the service is intended to be used only in proximity. For example, DRM protected content which is only to be consumed at a certain location or prisoners on parole who need to stay at home. Therefore, exemplary embodiments of the invention may be applied in very different technical scenarios.

A gist of an exemplary embodiment of the invention is to measure the response time of a transponder. When a relay attack is done, this will take some time. When the reader detects that the time is longer than normal (outside tolerances), it may conclude a relay attack has been mounted. The transponder can do the same.

However, such a scenario may raise the problem that there is a window of time in which a response of a non-attacked system can come. If this window is large, to accommodate for a large variation in system behaviour (within one system or between systems), then a fast system leaves time to mount an attack. A solution according to an exemplary embodiment of the invention is to make the time window smaller than the amount of time that the fastest relay attack would add. Thus, the relay attack window should be made as small as possible.

RFID systems suffer from different location-based attacks such as distance fraud, mafia fraud and terrorist fraud attacks. Among them, mafia fraud attack is the most serious since this attack can be mounted without the notice of both the reader and the tag. An adversary performs a kind of man-in-the-middle attack between the reader and the tag. It is very difficult to prevent this attack since the adversary does not change any data between the reader and the tag. Recently distance bounding protocols measuring the round-trip time between the reader and the tag have been researched to prevent this attack.

RFID (radio frequency identification) tags, transponder or contactless smart cards are often used for proximity authentication. Such a device may serve as a theft-deterrent in automobiles. Present as a tiny, concealed chip in the ignition key of the driver, a tag authenticates the key to a reader near the key slot as a precondition for starting the engine. RFID tags and contactless smart cards are normally passive; they operate without any internal battery and receive the power from the reader. This offers long lifetime but results in short read ranges and limited processing power. They are also vulnerable to different attacks related to the location: distance fraud and relay attacks. Relay attacks occurs when a valid reader is tricked by an adversary into believing that it is communication with a valid tag and vice versa. That is, the adversary performs a kind of man-in-the-middle attack between the reader and the tag. It is difficult to prevent these attacks since the adversary does not change any data between the reader and the tag. Therefore relay attacks cannot be prevented by cryptographic protocols that operate at the application layer. Although one could verify location through the use of GPS coordinates, RFID tags do not lend themselves to such applications. Distance bounding protocols are a good solution to prevent such distance fraud and relay attacks. These protocols measure the signal strength or the round-trip time between the reader and the tag. However the proof based on measuring signal strength is not secure as an adversary can easily amplify signal strength as desired or use stronger signals to read from afar.

There are three types of attacks related with distance between the reader and the tag. The dishonest tag may claim to be closer than he really is. This attack is called distance fraud attack. There are two types of relay attacks: mafia fraud and terrorist fraud attack.

In the mafia fraud attack scenario, both the reader (R) and the tag (T) are honest, but a malicious adversary is performing man-in-the-middle attack between the reader and the tag by putting fraudulent tag (T') and receiver (R'). The fraudulent tag T' interacts with the honest reader R and the fraudulent reader R' interacts with the honest tag T. T' and R' cooperate together. It enables T' to convince R of a statement related to the secret information of an honest tag T, without actually needing to know anything about the secret information.

Terrorist fraud attack is an extension of the mafia fraud attack. The tag T is not honest and collaborates with fraudulent tag T' in this attack. The dishonest tag T uses T' to convince the reader that he is close, while in fact he is not. T' does not know the long-term private or secret key of T. Among these attacks, mafia fraud attack is the most serious since this attack can be mounted without the notice of both the reader and the tag.

A distance bounding protocol consists of fast bit exchanges phase where the reader sends out one bit and starts a timer. Then the tag responds to the reader with one bit that stops the timer. The reader uses the round trip time to extract the propagation time. After series of n rounds (n is a security parameter), the reader decides whether the tag is within the limitation of the distance. In order to extract the propagation time, the processing time of the tag must be as short and invariant as possible. The communication method used for these exchanges is different from the used one for the ordinary communication. For example, an ultra wide band (UWB) channel is used to achieve a resolution of 10 cm. It does not contain any error detection or correction mechanism in order not to make additional variable cycles of processing.

The above mentioned Hancke and Kuhn's protocol (HKP) is explained in the following as a reference-point because it is the most popular distance bounding protocol in the RFID framework. After exchanges of random nonces (Na and Nb), the reader and the tag compute two n-bit sequences, v0 and v1, using a pseudorandom function (typically a MAC algorithm, a hash function, or etc.). Then the reader sends a random bit for n times. Upon receiving a bit, the tag sends back a bit (Ri) from v0, if the received bit Ci equals 0. If Ci equals 1, then it sends back a bit (Ri) from v1. After n iterations, the reader checks the correctness of Ri's and the propagation time. In each round, the probability that adversary sends a correct response is normally ½ if he does not query the tag in advance. However it is ¾ if he does ask the tag in advance. Because the adversary could slightly accelerate the clock signal provided to the tag and transmit an anticipated challenge Ci' before the reader sends its challenge Ci. In half of all cases, the adversary will have the correct guesses, that is Ci'=Ci, and therefore will have obtained in advance the correct value Ri that is needed to satisfy the reader. In the other half of all cases, the adversary can reply with a guessed bit, which will be correct in half of all cases. Therefore, the adversary has ¾ probability of replying correctly.

One of solutions to reduce the probability less than ¾ is to include signed messages. However signed messages could not be sent with UWB as it is very sensitive to the background noise. It should be sent by normal communication method with error detection or correction technique. Therefore this approach would put an overload on computation of a tag as well as communication, which causes the protocol slower.

Another protocol's solution (MP) is to apply "void challenges" in order to reduce the success probability of the adversary. The challenges from the reader are divided into two categories, full challenge and void challenge. After exchanges of random nonces (Na and Nb), the reader and the tag compute 3 n-bit sequence, P||v0||v1, using a pseudorandom function. The string P indicates the void-challenges; that is, if Pi=1 reader sends a random challenge and if Pi=0 it does not. These void-challenges allow the tag to detect if an adversary is trying to get the responses in advance. The adversary can choose between two main attack strategies: asking in advance to the tag, taking the risk that the tag uncovers him, and without taking in advance and trying to guess the responses to the challenges when they occur. The adversary's success probability depends on pf, the probability of the occurrence of full challenge, and can be calculated:

$$p_{MP} = \begin{cases} \left(1 - \frac{p_f}{2}\right)^n, & \text{if } p_f \leq \frac{4}{5} \text{(without asking in advance)} \\ \left(p_f \times \frac{3}{4}\right)^n, & \text{if } p_f > \frac{4}{5} \text{(asking in advance)} \end{cases} \quad (1)$$

The adversary's success probability is the lowest when pf=⅘, but it does not result easy to generate a bit string P with such value of pf. However, the value pf=¾ is close to ⅘ and it is much easier to generate. By generating a random 2 n-bit P and letting '00', '01', or '10' as Pi=1 and '11' as Pi=0, we can get pf=¾. If the responses of the tag are taken out from one edge of the bit-string (LSB, the least significant bit) or from the other one (MSB, the most significant bit) depending on the challenge, n+1 bits are enough to generate v0||v1. Therefore total 3 n+1 bits (2 n bits for P, n+1 bits for responses) are required to store. The success probability of the adversary is $(\frac{5}{8})^n$ if the string P is random. This protocol does not use any additional signing message to reduce the success probability of the adversary. However, it requires three (physical) states: 0, 1, and void, which is practically very difficult to implement. Furthermore its success probability of the adversary is higher than $(\frac{1}{2})^n$.

Figure 2:
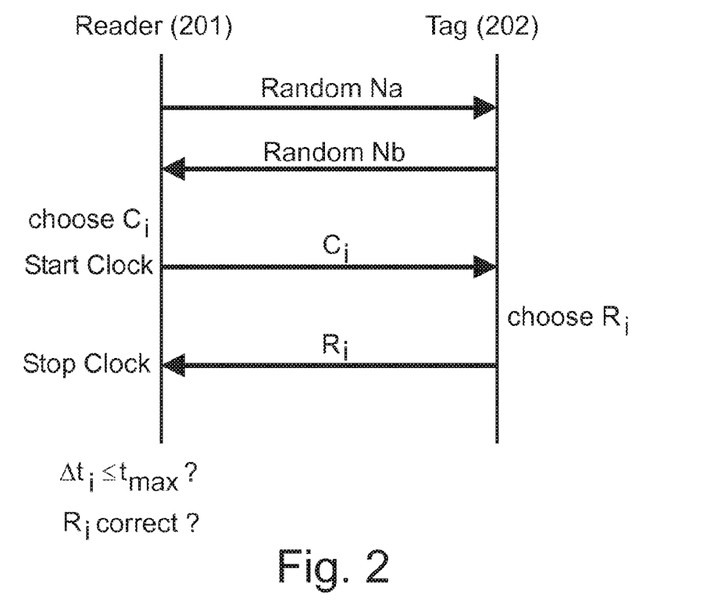
FIG. 2 shows a message flow between a reader and a transponder according to an exemplary embodiment of the invention.

To overcome the disadvantage of the MP protocol, a new protocol is proposed that uses mixed challenges as shown in FIG. 2. The challenges from the reader to the tag in the fast bit exchanges are divided into two categories, random challenges and defined challenges. The random-challenges are random bits from the reader and the defined-challenges are predefined bits known to the reader and the tag in advance. As shown in FIG. 2, the reader (201) and the tag (202) compute 4 n-bit sequence (by optimization, in average 2.5 n+1 bits (and about 2.75 n+1 bits with margin) is enough) for T||D||v0||v1, after exchange of random nonces (Na and Nb). The string T indicates random-challenges; if Ti=1 the reader sends a random bit Si∈{0, 1} and if Ti=0 it sends a predefined bit Di to the tag. These defined-challenges allow the tag to detect if an adversary is trying to get the responses in advance. The tag sends out a bit from v0 or v1 according to the value of Ci if Ti=1 (random challenge). When Ti=0 (defined challenge), the tag sends out a bit from v0 if Ci=Di and v1 if Ci≠Di (it detects an error). From the moment the tag detects an error, it sends complementary values of the expected bits, vij', or the original values vij for all subsequent iterations. The choice of vij' and vij is randomly done by the tag. That is, if the tag detects an error in ith round, it may send v(i+1)j' or v(i+1)j in (i+1)th round regardless of error detection afterwards. By doing this, dual error detection both by reader and tag is possible. The method for exchanging the challenge and response as shown on FIG. 2 may be repeated for several rounds. Thus, the reader (201) may send a Ci several times and the tag (202) sends every time a response Ri. The iteration of change of Ci and Ri may be done till n rounds. Thus, in this case, the average response time (Δti) is compared for checking.

From the point of the adversary's view, all Ci's from the reader look like random. Therefore he cannot distinguish random-challenges from defined-challenges. For simplicity to explain, it is first assumed that the tag only sends complementary values of the expected bits vij for all subsequent iterations once it detects an error.

"pd" is defined as the probability that a challenge is a defined challenge. Similarly, "pr" is defined as the probability that a challenge is a random challenge. Therefore, pd+pr=1.

In the noise-free case, the adversary can choose between two main attack strategies. First he can guess the responses to the challenges without asking in advance to card. Secondly he can ask in advance to the tag, taking the risk that the card uncovers him. It is denoted that the adversary's probability of success of MP without asking is P(no-ask) and that with asking as P(ask). The adversary's probability of success depends on the probability of the occurrence of full or void challenges as shown in equation (1). Therefore P(no-ask) and P(ask) are different according to the probability of the occurrence of full challenges. With the recommended pf=¾, the adversary's probability of the success without asking, P(no-ask), is (⅝)n, which is higher than P(ask). In the proposed protocol the adversary's probability of the success without asking in advance, P(no-ask), is always (½)n. Therefore, P(ask) is computed and compared with P(no-ask).

To compute P(ask), it is assumed that an adversary asks in advance to card, taking the risk that the card uncovers him. If the challenge, Ci*, that the adversary asks to the tag in advance is the same with the challenge, Ci, that the reader sends to the tag, he sends the response received from the tag to the reader. If Ci*≠Ci, then he sends a random response to the reader. Although the adversary's attack is detected by the tag there is still a chance of not being detected by the reader. To analyze this probability, the following events are defined:

Ai: the event that the adversary's attack is detected by the reader in the ith round, Ai': the event that the adversary's attack is not detected by the reader in the ith round, Bi: the event that the adversary's attack is detected by the tag in the ith round, Bi': the event that the adversary's attack is not detected by the tag in the ith round.

The event of not being detected by the reader in the ith round, Ai', depends on the event of being detected by the tag in the (i−1)th round, because the tag gives complementary values once it detects an error and the adversary does not know that it is original or complementary value. The probability of not being detected by the reader in the ith round provided that it is not detected by the tag in the (i−1)th round, P(Ai'|B(i−1)'), is $$P(A'_i | B'_i) = P_{random\ ch.\ \&\ not\ detected} + P_{defined\ ch\ \&\ not\ detected} \quad (2)$$

$$= P_r \times (P_{C_i^* = C_i\ \&\ not\ det.\ by\ Reader} +$$

$$P_{C_i^* \neq C_i\ \&\ not\ det.\ by\ Reader}) + p_d \times$$

$$(P_{C_i^* = C_i\ \&\ not\ det.\ by\ Reader} + P_{C_i^* \neq C_i\ \&\ not\ det.\ by\ Reader})$$

$$= p_r\left(\frac{1}{2} \times 1 + \frac{1}{2} \times \frac{1}{2}\right) + p_d\left(\frac{1}{2} \times 1 + \frac{1}{2} \times \frac{1}{2}\right)$$

$$= \frac{3}{4}p_r + \frac{3}{4}p_d = \frac{3}{4}$$

If the challenge is random and Ci*=Ci, then the adversary can correctly answer the response. If the challenge is random and Ci*≠Ci, then the adversary have a chance of ½ of giving correct response. If the challenge is defined and Ci*=Ci, he can correctly answer the response. If the challenge is defined and Ci*≠Ci, he has a chance of ½ of giving correct response to the reader although he is always detected by the tag.

The probability of not being detected by the reader in the ith round provided that it is detected by the tag in the (i−1)th round, P(Ai'|Bi−1), is $$P(A'_i | B'_{i-1}) = P_{random\ ch.\ \&\ not\ detected} + P_{defined\ ch.\ \&\ not\ detected} \quad (3)$$

$$= p_r \times (P_{C_i^* = C_i\ \&\ not\ det.\ by\ Reader} +$$

$$P_{C_i^* \neq C_i\ \&\ not\ det.\ by\ Reader}) + p_d \times$$

$$(P_{C_i^* = C_i\ \&\ not\ det.\ by\ Reader} + P_{C_i^* \neq C_i\ \&\ not\ det.\ by\ Reader})$$

$$= p_r\left(\frac{1}{2} \times 0 + \frac{1}{2} \times \frac{1}{2}\right) + p_d\left(\frac{1}{2} \times 0 + \frac{1}{2} \times \frac{1}{2}\right)$$

$$= \frac{1}{4}p_r + \frac{1}{4}p_d = \frac{1}{4}$$

If the challenge is random and Ci*=Ci, then the adversary cannot answer the response correctly. Because he sends the same response from the tag (of not knowing that he is detected in the previous round). This response from the tag is the complementary value as the tag detected an error in the previous round. If the challenge is random and Ci*≠Ci, then the adversary have a chance of ½ of giving correct response, because he chooses a random response. If the challenge is defined and Ci*=Ci, he is detected by the reader as the response from the tag is complementary. If the challenge is defined and Ci*≠Ci, he has a chance of ½ of giving correct response to the reader as he chooses a random response.

The probability of not being detected by the reader in the ith round is computed by $$P(A'_i) = \quad (4)$$

$$P(A'_i | B'_{i-1})P(B'_{i-1}) + P(A'_i | B'_{i-1})P(B_{i-1}) = \frac{3}{4}P(B'_{i-1}) + \frac{1}{4}P(B_{i-1})$$

where, P(A'₁)=¾ and i=2, 3, . . . .

The probability of being detected by the tag in the ith round depends on the probability of being detected by the tag in the (i−1)th round. Therefore, $$P(B_i) = P(B_i|B_{i-1})P(B_{i-1}) + P(B_i|B'_{i-1})P(B'_{i-1}) \quad (5)$$

Figure 4:
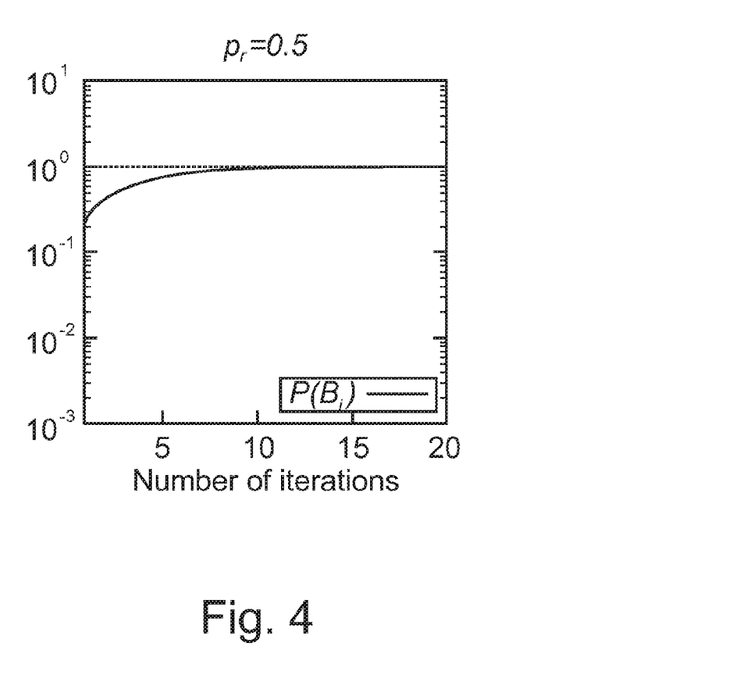
FIG. 4 shows a probability of being detected by a transponder according to an exemplary embodiment of the invention.

The P(Bi|Bi−1) is always 1 since the tag already detected an error in the (i−1)th round. The P(Bi|B'i−1) is ½ pd since tag can detect an error when the challenge is a defined one and Ci*≠Ci. Therefore, equation (5) can be written as follows:

$$P(B_i) = P(B_{i-1}) + \frac{1}{2}p_d P(B'_{i-1}) \quad (6)$$

$$= P(B_{i-1}) + \frac{1}{2}(1 - p_r)P(B'_{i-1}) \quad (7)$$

where, P(B₁)=½ pd=½(1−pr) and i=2, 3, . . . . If pr=½, we have P(B₁)=¼, P(B₂)=⁷⁄₁₆, P(B₃)=³⁷⁄₆₄, etc. As shown in FIG. 4, P(Bi) converges to 1 as n increases.

Therefore from equation (4), P(A'₁)=¾, P(A'₂)=¹⁰⁄₁₆, P(A'₃)=³⁴⁄₆₄, P(A'₄)=¹¹⁸⁄₂₅₆, etc if pr=½. Therefore, the probability of not being detected by the reader until the ith round, $$P(\text{ask})[i] = \prod_{k=1}^{i} P(A'_i).$$

Figure 5:
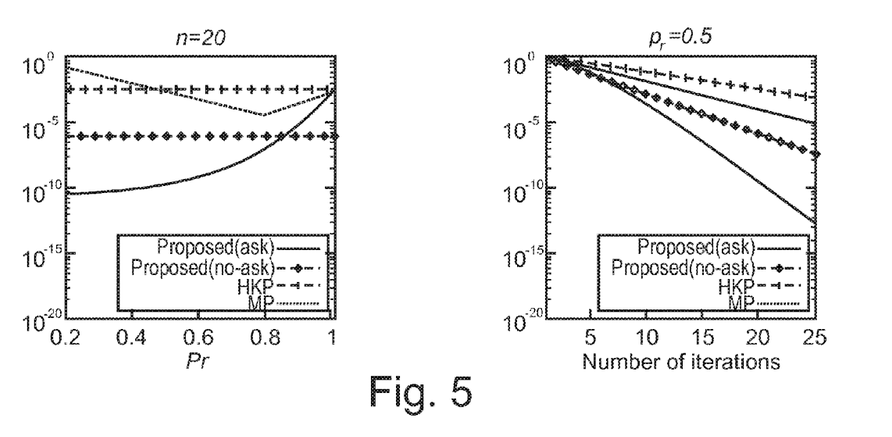
FIG. 5 shows a probability of not being detected by a reader according to an exemplary embodiment of the invention.

The probabilities of not being detected by the reader are depicted by varying pr and n in FIG. 5. For the comparison, the success probabilities of the adversary of two other protocols, HKP and MP, are shown. The adversary's probability of success of the protocol is smaller than those of HKP and MP. Furthermore the adversary's probability of success with asking, P(ask), is smaller than that with no asking, P(no-ask)= (½)ⁿ, as the number of iterations increases. When pr=0.5, P(ask) becomes larger than P(no-ask) after 7 rounds. It means that the success probability of the adversary is bounded by (½)ⁿ from 7th round and the adversary cannot get any benefit from asking in advance.

Instead of sending complementary values after detecting an error, the card may become mute. Then P(A'i|B(i−1))=½ as the adversary chooses the responses randomly for both random and defined challenges. This probability is larger than that of the case of sending complementary value (see equation (3)). Therefore the probability of not being detected by the reader in the ith round, P(A'i) increases to ¾P(B' (i−1))+½P(B(i−1)), which is larger than that of equation (4).

Until now, it is supposed that the tag is honest and the adversary tries to perform a mafia fraud attack. In this section, it is considered the case of dishonest tag. The tag knows the defined-challenges before the start of the fast bit exchanges as he knows T. Therefore he may try to deceive the reader with distance fraud attack. The probability of the success of the distance fraud attack by the dishonest tag for a round is $$P_{distance\ fraud\ attack} = P_{random\ challenge\ and\ deceive} +$$
$$P_{defined\ challenge\ and\ deceive}$$
$$= p_r \times \left(p_{v_i^0 = v_i^1\ and\ deceive} + P_{v_i^0 \neq v_i^1\ and\ deceive}\right) + p_d$$
$$= p_r \times \left(\frac{1}{2} \times 1 + \frac{1}{2} \times \frac{1}{2}\right) + p_d = \frac{3}{4}p_r + p_d = 1 - \frac{1}{4}p_r$$

If the challenge is a random challenge (Ti=1) and ith bits of v0 and v1 are equal, then the tag can send its response early. If ith bits of v0 and v1 are not equal when Ti=1, then the tag chooses the response randomly. Finally, if the challenge is a defined challenge (Ti=0), then he can send its response early.

Figure 6:
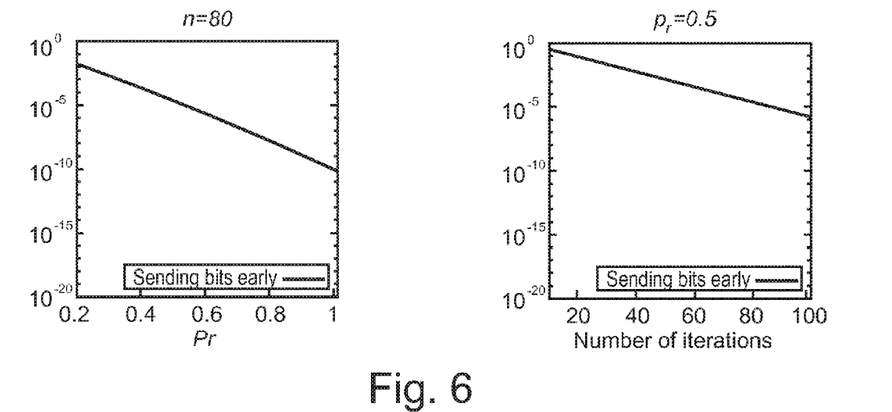
FIG. 6 shows a probability of a distance fraud attack.

The success probabilities according to the variation of pr and n are depicted in FIG. 6. If pr=½, which is the average case when a pseudorandom function is used to generate a bit string, then the probability is (⅞)$^n$.

In a real application, there may exist errors due to the channel noise although the adversary does not attack. Therefore, some channel errors may be allowed for practical reasons. However the adversary may get benefit from this allowance of channels errors. The success probability of the adversary in the noisy case is analyzed.

It is assumed that the maximum (j−1) errors are allowed in the tag. That is, the tag starts to send complementary values after jth error is detected. The following events are defined:
Ai: the event that the error is detected by the reader in the ith round,
Ai': the event that the error is not detected by the reader in the ith round,
Bij: the event that total j errors are detected by the tag until the ith round,
Bij': the event that total j errors are not detected by the tag until ith round.
Then, it considered that $$P(B_i^j) = P(B_i^j | B_{i-1}^j) P(B_{i-1}^j) + P(B_i^j | B_{i-1}^{j-1}) P(B'_{i-1}^j)$$

The probability of P(Bji|Bj(i−1))) is 1 as j errors are already detected in (i−1)th round. The probability of P(Bji|B(j−1)(i−1)) is ½ (1−pr). As the tag starts to send the complementary values after it detects jth error, the probability of not being detected by the reader, P(A'i), depends on the P(Bji). Once tag detects jth error, probability of not being detected by the reader becomes ¼. Otherwise, probability of not being detected by the reader is ¾. Therefore, $$P(A_i') = \tag{8}$$
$$P(A_i' | B_{i-1}^{'j}) P(B_{i-1}^{'j}) + P(A_i' | B_{i-1}^j) P(B_{i-1}^j) = \frac{3}{4} P(B_{i-1}^{'j}) + \frac{1}{4} P(B_{i-1}^j)$$

where, P(A1)=¾ and i=2, 3, . . . .

For example, it is supposed that j=2 and pr=0.5. It means that only one error is allowed in the tag and the tag sends complementary values after it detects two errors. Then, $$P(B_i^2) = P(B_i^2 | B_{i-1}^2) P(B_{i-1}^2) + P(B_i^2 | B_{i-1}^1) P(B_{i-1}^1) P(B'^2_{i-1}) = \tag{9}$$
$$P(B_{i-1}^2) + \frac{1}{4} P(B_{i-1}^1) P(B'^2_{i-1})$$

Figure 7A:
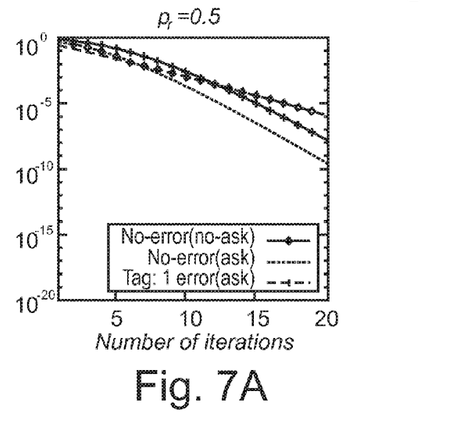
FIGS. 7a and 7b show a probability of not being detected by a reader in a noisy channel.

To compute P(B²i), P(B¹i) has to computed that is the same with P(Bi) in the previous section. Therefore, P(B¹1)=¼, P(B¹2)=7/16, P(B¹3)=37/64, etc. The P(B²1)=0 as two errors can not be detected in the first round. From the equation (9), P(B²2)=1/16, P(B²3)=169/1024, etc. Finally, P(A'1)=¾, P(A'2)=¾, P(A'3)=46/64, P(A'4)=2734/4096, etc from the equation (8). The probability of not being detected by reader until ith round, $$P(ask)[i] = \prod_{k=1}^{i} P(A_k'),$$

as depicted in FIG. 7A. The probability of not being detected by the reader with 1 error allowance in the tag is higher in the early rounds. However it decreases as the number of iterations increases and finally it becomes smaller than (½)$^n$ from 13th round. Therefore it can be concluded that the provided protocol provides the success probability of the adversary of (½)$^n$ even in noisy channel with reasonable iterations where some errors in the tag are allowed.

Now it is assumed that the maximum (j−1) errors are allowed in the reader. That is, the reader decides that the attack occurs after jth error is detected. Contrary to the error detection by the tag, the detection of the error by the reader does not change P(Ai) nor P(Bi). Therefore the probability of not being detected by reader until ith round, P(ask)[i] is $$P_{ask}[i] = \begin{cases} \sum_C \prod_{k=1}^{i} \{a_k P(A_k) + a_k' P(A_k')\}, i \geq j \\ 1, i < j \end{cases}$$

Where, ak∈{0, 1} and C={(a1, . . . , ai)|Σak<j}. That is, P(ask)[i] is the probability that less than j errors are detected by the reader until ith round. For example, if j=2, then $$P_{ask}[1] = 1,$$
$$P_{ask}[2] = P(A_1')P(A_2') + P(A_1)P(A_2') + P(A_1')P(A_2),$$
$$P_{ask}[3] = P(A_1')P(A_2')P(A_3') + P(A_1)P(A_2')P(A_3') + P(A_1')P(A_2)P(A_3') + P(A_1')P(A_2')P(A_3),$$
$$P_{ask}[4] = P(A_1')P(A_2')P(A_3')P(A_4') + P(A_1)P(A_2')P(A_3')P(A_4') + P(A_1')P(A_2)P(A_3')P(A_4') + P(A_1')P(A_2')P(A_3)P(A_4') + P(A_1')P(A_2')P(A_3')P(A_4),$$
$$P_{ask}[5] = \ldots$$

Figure 7B:
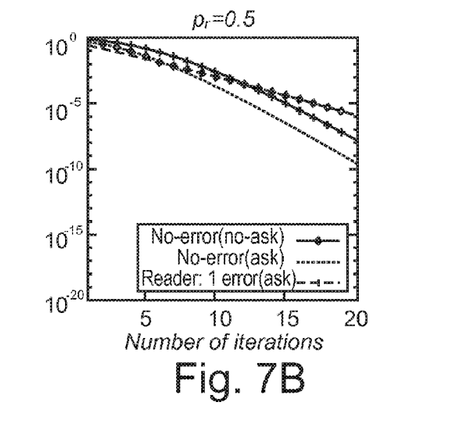

If pr=0.5, then Pask[i]={1, 0.906, 0.701, 0.457, 0.255, . . . }. The result is depicted in FIG. 7. As shown in FIG. 7B, the protocol provides the success probability of the adversary of (½)$^n$ even in noisy channel with reasonable iterations where some errors in the reader are allowed.

In a new attack scenario such that an adversary asks in advance to card, taking the risk that the card uncovers him. If the challenge, C*i, that the adversary asks to the tag in advance is the same with the challenge, Ci, that the reader sends to the tag, he sends the response received from the tag to the reader. If C*≠Ci, then he sends a random response to the reader.

However, after the first of C*i≠Ci, he changes his behavior. That is, he sends the complementary value of the response if C*i=Ci (as he expects that the tag sends the complementary value). He sends a random response if C*i≠Ci. It is assumed that the first mismatch between C*i and Ci occurs at mth round. Then the probability of not being detected by the reader in the ith round is $$P(A'_i) = \begin{cases} \frac{3}{4}P(B''_{i-1}) + \frac{1}{4}P(B_{i-1}), & i \le m \\ \frac{1}{4}P(B''_{i-1}) + \frac{3}{4}P(B_{i-1}), & i > m \end{cases}$$

The probability of not being detected by the reader in the ith round provided that it is detected by the tag in the (i−1)th round, $P(A'i|Bi−1)$, increases from $\frac{1}{4}$ to $\frac{3}{4}$. Therefore the benefit of sending complementary values by the tag disappears and the probability of not being detected by reader until ith round, $$P(\text{ask})[i] = \prod_{k=1}^{i} P(A'_i)$$

is roughly bounded to $(\frac{3}{4})^n$ as n increases. This comes from the fact that the adversary knows when the complementary values come.

Figure 8:
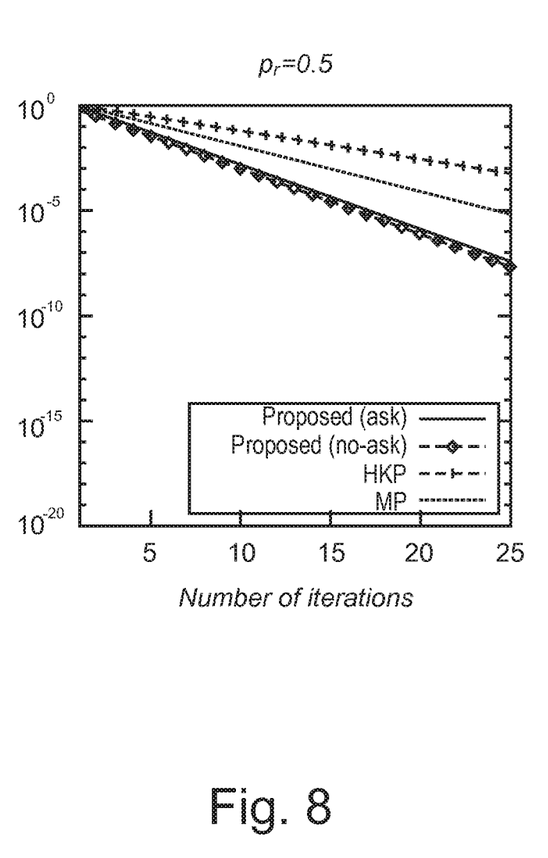
FIG. 8 shows a probability of not being detected by a reader.

This new attack may be defeated by sending complementary values randomly. That is, the tag may not send the complementary values even if it detects an error. It randomly chooses whether it sends complementary values or not after it detects an error. Therefore the adversary cannot know when the complementary values come after error occurs. Then the probability of not being detected by the reader in the ith round provided that it is detected by the tag in the (i−1)th round, $P(A'i|Bi−1)$, becomes $\frac{1}{4}$ or $\frac{3}{4}$. In average, it becomes $\frac{1}{2}$. Therefore Pask[i] is roughly bounded by $(\frac{1}{2})^n$ as n increases as depicted in FIG. 8.

Several variants on the behavior of the tag may be made when it detects an error. The point is that the tag should give response that the adversary can get the success probability of $\frac{1}{2}$ per round with. One variant is always giving random values once the tag detects an error. Then the adversary can succeed in cheating the reader with the probability of $\frac{1}{2}$ per round.

The number of the bits to be stored in a tag is 4 n. However, by using other protocols, n+1 bits are enough to generate v0∥v1. That is, the responses of the tag are taken out from one edge of the bit-string (LSB, the least significant bit) or from the other one (MSB, the most significant bit) depending on the challenge. The probability of being defined challenges is about $\frac{1}{2}$. Therefore around n/2 bits for D are needed. By considering the variation, $\frac{3}{4}$n bits are enough. Consequently, in average 2.5 n+1 bits (n bits for T, $\frac{1}{2}$n bits for D, n+1 bits for v0 and v1) may be required to be stored in the tag. With the consideration of margin for D, 2.75 n+1 bits are needed.

Relay attack is one of the most serious problems in RFID and contactless smartcard applications. Distance bounding protocols prevent relay attacks by computing the distance between the reader and the tag, where they measure the round-trip time between the reader and the tag. The Hancke and Kuhn proposed a distance bounding protocol with the probability of the adversary's success of $(\frac{3}{4})^n$, where n is a security parameter. After that, many tried to decrease the probability of the adversary's success to $(\frac{1}{2})^n$. Almost all of them used signed messages that made the protocol to be slower due to the computation and communication of a signing message. Other protocols does not use signed messages but requires three (physical) states: 0, 1, and void, which is difficult to implement. Furthermore the probability of the adversary's success is $(\frac{5}{8})n$. Here, a new modification is proposed with mixed challenges where only two (physical) states are used: 0 and 1. Furthermore the probability of the adversary's success is $(\frac{1}{2})^n$. The protocol may be used in a noisy channel.

Figure 3:
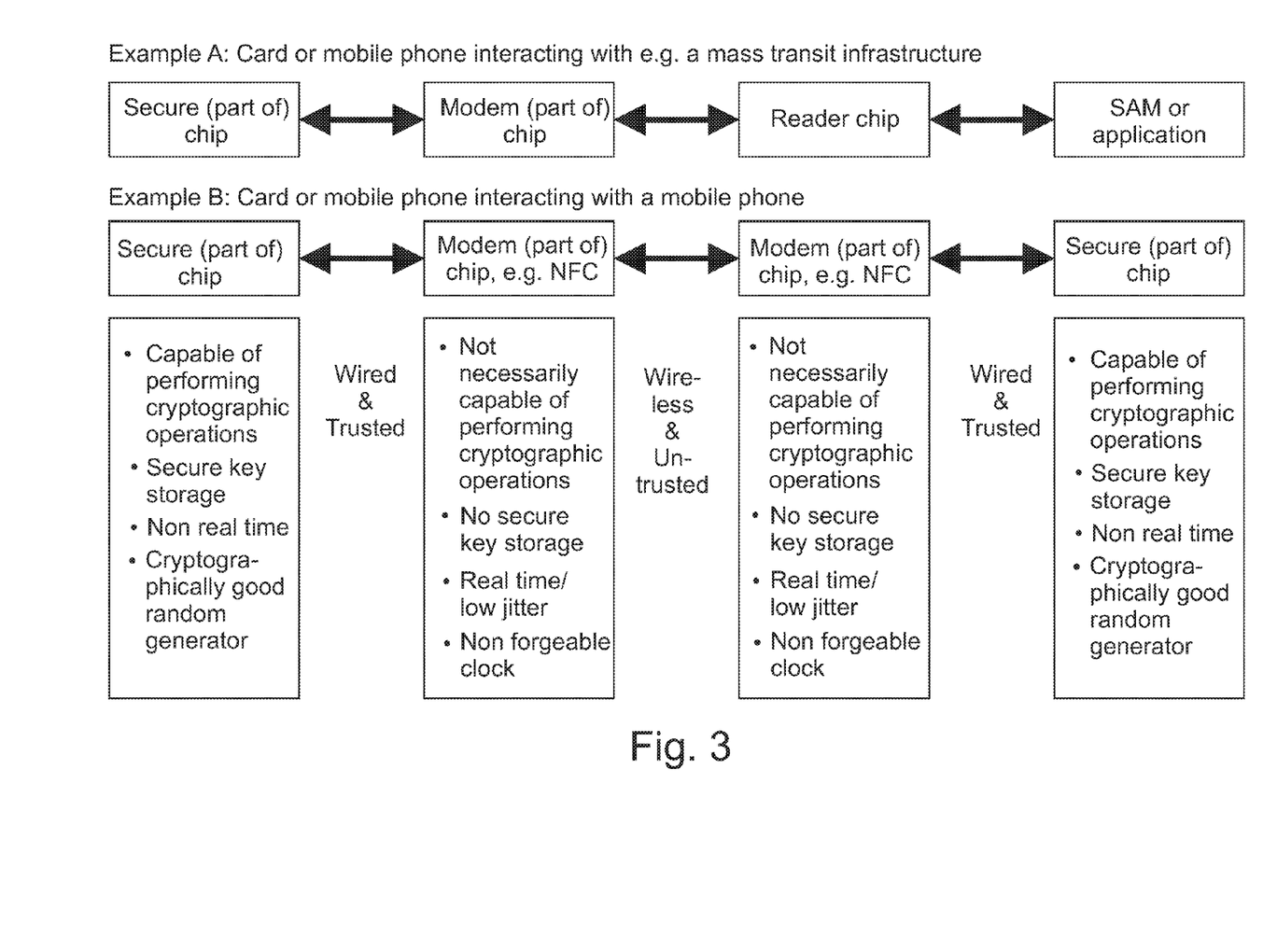
FIG. 3 shows in which exemplary fields embodiments of the invention can be used.

FIG. 3 illustrates two different examples of a communication system.

In a first example denoted with reference numeral 300, a card or mobile phone interacts with for instance a mass transit infrastructure.

In a second scenario which is denoted with reference numeral 350, a card or mobile phone interacts with a mobile phone.

The properties of such systems in a classification as wired and trusted, wireless and untrusted, and wired and trusted can be seen in FIG. 3.

According to an exemplary embodiment of the invention, the entire functionality of the reader and the transponder may be reversed, so the protocol flow is in the other direction. This is an equivalent solution to the explicitly disclosed systems and is also covered by the scope of the claims.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. Reader for determining the validity of a connection to a transponder wherein the reader is adapted to send a first binary code based on predefined numbers to said transponder and to receive a second binary code from said transponder in response to the first binary code, wherein the reader is designed to measure a response time of said transponder based on a time interval between sending the first binary code based on predefined numbers to said transponder and receiving the second binary code from said transponder in response to the first binary code and wherein the reader is designed to authenticate the transponder based on the received second binary code simultaneously with the measuring of the response time wherein the reader is designed to send a first random number to the transponder and to receive a second random number from the transponder for generating the first binary code based on the first random number and the second random number, wherein the first random number and the second random number correspond to the predefined numbers, and wherein the first binary code is a random number or a predefined number depending on the first and the second random number; and wherein the reader is designed to authenticate the transponder based on an evaluation whether the second binary code is valid, the second binary code being generated based on the first binary code, the first random number and the second random number.

2. Reader according to claim 1, wherein the reader is designed to qualify the connection to the transponder as valid only upon determining that both the time interval is within a predetermined time window and that the received second binary code is valid.

3. A transponder for determining the validity of a connection to a reader wherein the transponder is designed to provide information for response time measurement to the reader, wherein the reader is designed to measure a response time of said transponder based on a time interval between sending a first binary code based on predefined numbers to said transponder and receiving a second binary code from said transponder in response to the first binary code, wherein the transponder is designed to authenticate the reader based on the first binary code received from the reader during the response time measurement, wherein the first binary code is based on predefined numbers, and to provide information for authentication to the reader by sending the second binary code in response to the first binary code, wherein the transponder is designed to receive a first random number from the reader and to send a second random number to the reader for generating the first binary code based on the first random number and the second random number; and wherein the transponder is designed to generate the second binary code comprising a first value, based on the first random number, the second random number and the first binary code when the first binary code is valid.

4. The transponder according to claim 3, wherein the transponder is designed to authenticate the reader based on an evaluation whether the first binary code generated based on the first random number and the second random number is valid.

5. The transponder according to claim 4, wherein the transponder is designed to generate the second binary code comprising a second value based on the first random number, the second random number and the first binary code when the first binary code is invalid.

6. The transponder according to claim 5, wherein the transponder is designed to receive further first binary codes, and,
    after the first binary code was invalid, to send further second binary codes in response to the further received first binary codes, wherein the further second binary codes comprise a third value complementary to the second value, or
    after the first binary code was invalid, to send further second binary codes in response to the further received first binary codes, wherein the further second binary codes comprise randomly the second value or the third value complementary to the second value.

7. A communication system comprising a reader according to claim 1 and a transponder for determining the validity of a connection to a reader wherein the transponder is designed to provide information for response time measurement to the reader, wherein the reader is designed to measure a response time of said transponder based on a time interval between sending a first binary code based on predefined numbers to said transponder and receiving a second binary code from said transponder in response to the first binary code, wherein the transponder is designed to authenticate the reader based on the first binary code received from the reader during the response time measurement, wherein the first binary code is based on predefined numbers, and to provide information for authentication to the reader by sending the second binary code in response to the first binary code, wherein the transponder is designed to receive a first random number from the reader and to send a second random number to the reader for generating the first binary code based on the first random number and the second random number.

8. Method for a reader of determining the validity of a connection to a transponder the method comprising:
    sending a first random number to the transponder,
    receiving a second random number from the transponder,
    generating a first binary code based on the first random number and the second random number, wherein the first binary code is a random number or a predefined number depending on the first and the second random number,
    sending the first binary code to said transponder,
    receiving a second binary code from said transponder in response to the first binary code,
    measuring a response time of the transponder based on a time interval between sending the first binary code and receiving the second binary code,
    authenticating the transponder based on the received second binary code simultaneously with the measuring of the response time; and based on an evaluation whether the second binary code is valid, the second binary code being generated based on the first binary code, the first random number and the second random number.

9. Method for a transponder of determining the validity of a connection to a reader, the method comprising:
    providing information for response time measurement to the reader, wherein the reader is designed to measure a response time of said transponder based on a time interval between sending a first binary code based on predefined numbers to said transponder and receiving a second binary code from said transponder in response to the first binary code,
    receiving a first random number from the reader,
    sending a second random number to the reader for generating the first binary code based on the first random number and the second random number,
    authenticating the reader based on the first binary code received from the reader during the response time measurement,
    providing information for authentication to the reader by sending a second binary code in response to the first binary code; and
    wherein the transponder is designed to generate the second binary code comprising a first value, based on the first random number, the second random number and the first binary code when the first binary code is valid.

10. A non-transitory computer-readable medium, in which a computer program is stored, which computer program, when being executed by a processor, is adapted to carry out or control a method according to claim 8.

11. A program element, which program element, when being executed by a processor, is adapted to carry out or control a method according to claim 8.

* * * * *